Jan. 5, 1943.  C. P. PEPPER  2,307,539
CENTRIFUGAL DEVICE
Filed March 25, 1942

Inventor:
Carl P. Pepper,
by Harry E. Dunham
His Attorney.

Patented Jan. 5, 1943

2,307,539

UNITED STATES PATENT OFFICE 2,307,539

CENTRIFUGAL DEVICE

Carl P. Pepper, Fort Wayne, Ind., assignor to General Electric Company, a corporation of New York Application March 25, 1942, Serial No. 436,131

4 Claims. (Cl. 200—80)

My invention relates to centrifugal devices and in particular to centrifugal switches of the type used for controlling the circuits of starting windings for dynamo-electric machines.

An object of my invention is to provide an improved centrifugal device which is simple in construction and reliable in operation.

Another object of my invention is to provide an improved centrifugal switch in which the operating weight member is resiliently biased against its pivotal support in the same direction as centrifugal force relative thereto to prevent rattling.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
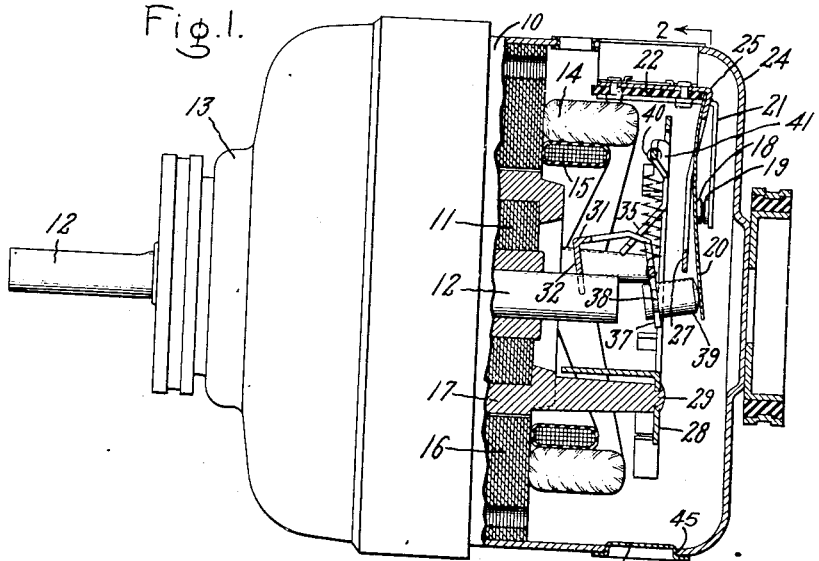
Figure 2:
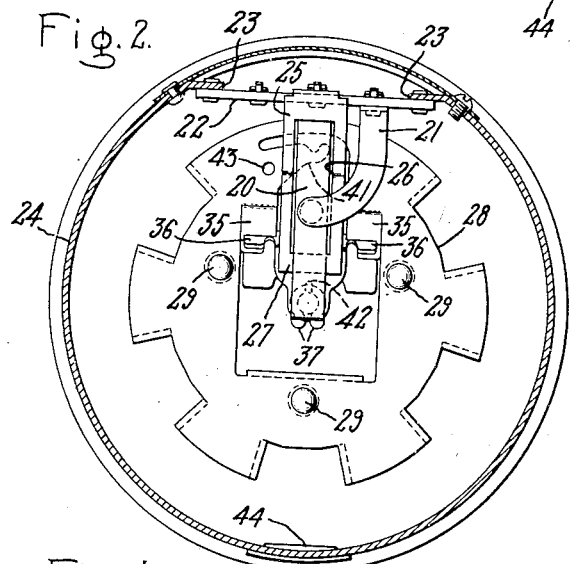
Figures 3, 4:
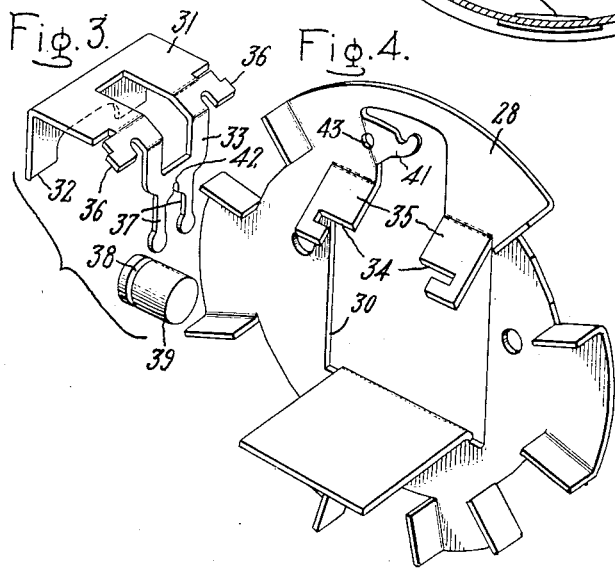
Figure 5:
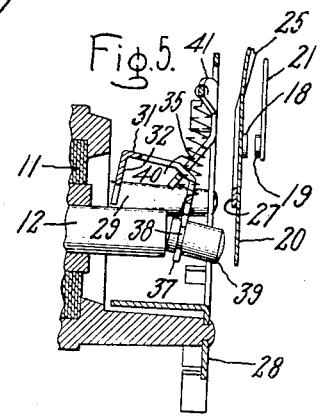

In the drawing, Fig. 1 is a side elevational view of a dynamo-electric machine partially broken away to illustrate a centrifugal switch embodying my invention; Fig. 2 is a sectional view taken along line 2—2 of Fig. 1; Fig. 3 is a perspective view of the centrifugal weight member shown in Figs. 1 and 2; Fig. 4 is a perspective view of the rotatable fan and centrifugal device supporting member shown in Figs. 1 and 2; and Fig. 5 is a partial sectional view of the arrangement shown in Fig. 1 with the centrifugal weight member in its outer position.

Referring to the drawing, I have shown a dynamo-electric machine having a stationary member 10 and a rotatable member 11 mounted on a shaft 12 which is supported in a bearing mounted in an end shield 13 of the stationary member of the machine. The dynamo-electric machine illustrated is a single phase induction motor and the excitation is provided by a single phase main field exciting winding 14 and a starting field exciting winding 15 which are arranged in slots in a core 16 of the stationary member and are arranged in slots in a core 16 of the stationary member and are adapted to induce electric currents in a cast squirrel cage winding 17 arranged in slots in the rotatable member 11.

In this type of induction motor, it is desirable that the starting field exciting winding should be energized during the period when the motor starts to operate, or under such operating conditions that the speed of the motor is reduced below a predetermined value and that this field exciting winding be deenergized when the speed of the motor exceeds a predetermined value. In order to accomplish this, I provide a centrifugal switch having electrical contacts 18 and 19 connected to the energizing circuit of the starting field exciting winding 15. These contacts 18 and 19 are mounted on stationary flexible supporting elements 20 and 21, respectively, which are secured to a mounting plate 22 of insulating material mounted on inturned tabs 23 punched from a stationary member housing 24. A guard or stop plate 25 also is mounted on the insulating plate 22 and is provided with an elongated opening 26 through which the contact support 20 extends. The lower transverse portion 27 of the guard plate 25 acts as a stop for the support 20 and limits the open circuit position of this contact support.

The motor is adapted to be cooled by a rotatable fan member 28 which is mounted on three support pins 29 cast integral with the rotor winding 17 and might be secured to the rotor in any other suitable manner. This rotatable fan member is formed with a central opening 30 in which a centrifugal operating device is mounted. This centrifugal device includes a weight member 31 having a weighted portion 32 at one end thereof and an angularly extending actuating element 33 adjacent the other end thereof. This weight member 31 is pivotally supported on the rotatable fan member 28 in slots 34 which are formed in a pair of angularly extending projections or tabs 35 punched from the central portion of the rotatable member 28. The weight member is provided with complementary interlocking tabs or projections 36 on each side thereof which are arranged to engage the adjacent surfaces of the sides of the slots 34 to provide axial location of the weight member on the rotatable member 28. The pivotal supports are constructed in such a manner that the weight member rests always on a knife edge of the supports in order to reduce friction. The weight member 31 is formed with a pair of fingers 37 adjacent the ends of the actuating or operating element portion 33, and these fingers are clamped in a circumferentially extending slot 38 about an engagement member or button 39 to hold it in position. The weight member and its pivotal support on the rotatable member 28 are formed and arranged such as to support the engagement button 39 substantially along the axis of the shaft 12, and this button is formed with a substantially spherical engaging surface arranged to engage the contact supporting element 20 and to bias this supporting element to close the electrical circuit between the contacts 18 and 19 when the weighted portion is in its inner position, as shown in Fig. 1. This provides a structure in which the center of the spherical surface of the button 39 remains substantially along the axis of the rotor of the machine in all of its positions. The weighted portion 32 is adapted to engage the shaft 12 in its inner position and thereby limit the outward movement of the operating element 33 and the end of the shaft 12 extends towards the engaging button 39 such that it acts as a stop to limit the inward movement of the button, as shown in Fig. 5. A resilient biasing coil spring 40 is secured to an adjustable finger or hook 41 formed on the rotatable member 28 and is secured in a slot 42 formed in the operating element 33. This spring biases the operating element towards the contact support 20 and tends to maintain the contacts 18 and 19 in closed circuit relationship until a predetermined centrifugal force acts on the weight member corresponding to a predetermined motor speed. The biasing force of this spring also acts upon the weight member in an outward direction and biases the weight member toward the pivotal supports 35 in the same direction as centrifugal force acts on the weight member relative to the pivotal support, that is, outwardly, but this biasing force acts in the opposite rotational sense to centrifugal force on the weight relative to the support, thereby preventing rattling of the weight member as it moves about its support from the closed circuit position shown in Fig. 1 to the open circuit position shown in Fig. 5. This is an important feature of applicant's construction, as rotation of the rotatable member 11 of the motor produces a centrifugal force on the weighted portion 32 of the weight member 31 and causes this weight member 31 to pivot outwardly to the position shown in Fig. 5 and the spring 40 at all times and in all positions of the weight member biases it into engagement with its pivotal support, thereby assuring quiet operation of the centrifugal device under all operating conditions. The desired biasing force can be adjusted in magnitude and direction to obtain accurate operation by bending the hook finger 41 axially of the machine in line with a weakening hole 43 formed in the rotatable supporting member 28, thereby varying the leverage of the spring. This adjustment is best made after the motor has been assembled by removing a removable cover 44 from an opening 45 in the end shield 24 after which the cover 44 is replaced.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A centrifugal switch including circuit controlling contacts, means for supporting said contacts in open circuit relationship, a rotatable member, a weight member, means for pivotally supporting said weight member on said rotatable member for pivotal movement outwardly from the axis of said rotatable member under the action of centrifugal force, an element operatively connected to said weight member substantially along the axis of said rotatable member and arranged to engage the support of one of said circuit controlling contacts for biasing said contacts into closed circuit relationship when said weight member is in its inner position, and resilient means for biasing said engagement element into engagement with said contacts and for biasing said weight member against said rotatable member pivotal supporting means for preventing rattling of said weight member.

2. A centrifugal switch including circuit controlling contacts, means for supporting said contacts in open circuit relationship, a rotatable member, a weight member, means for pivotally supporting said weight member on said rotatable member for pivotal movement outwardly from the axis of said rotatable member under the action of centrifugal force, an element mounted on said weight member and having a substantially spherical engaging surface substantially along the axis of said rotatable member arranged to engage the support of one of said circuit controlling contacts for biasing said contacts into closed circuit relationship when said weight member is in its inner position, and resilient means for biasing said element into engagement with said contacts and for biasing said weight member outwardly against said rotatable member pivotal supporting means for preventing rattling of said weight member.

3. A centrifugal operating device including a rotatable member, a weight member including a weighted portion and an operating element extending angularly therefrom, means for pivotally supporting said weight member on said rotatable member with said weighted portion and said operating element on opposite sides of said support for pivotal movement of said weighted portion outwardly from the axis of said rotatable member under the action of centrifugal force, and resilient means for biasing said weight member against said rotatable member pivotal supporting means for preventing rattling of said weight member.

4. A centrifugal operating device including a rotatable member, a weight member including a weighted portion and an operating element extending angularly therefrom, means for pivotally supporting said weight member on said rotatable member with said weighted portion and said operating element on opposite sides of said support for pivotal movement of said weighted portion outwardly from the axis of said rotatable member under the action of centrifugal force, resilient means for biasing said weight member outwardly against said rotatable member pivotal supporting means for preventing rattling of said weight member, and an adjustable finger on said rotatable member secured to said resilient means for adjusting the leverage of said resilient biasing means.

CARL P. PEPPER.